United States Patent Office 3,157,638
Patented Nov. 17, 1964

3,157,638
PROCESS FOR THE PRODUCTION OF HEXAKIS (AZIRIDINYL) PHOSPHONITRILE
Gerhard F. Ottmann, Hamden, Roy P. Alexander, Killingworth, and Ehrenfried H. Kober, Hamden, Conn., assignors to Olin Mathieson Chemical Corporation, New York, N.Y., a corporation of Virginia
No Drawing. Filed July 17, 1962, Ser. No. 210,551
5 Claims. (Cl. 260—239)

This invention relates to an improved process for the production of hexakis(aziridinyl)phosphonitrile, also designated 2,2,4,4,6,6 - hexakis(aziridinyl)cyclotriphosphaza-1,3,5-triene, an insect steralint.

This product has previously been prepared by a long, laborious and costly procedure in a homogeneous system requiring anhydrous conditions, long periods of contact of about 6 to 10 days and careful control to maintain a relatively low temperature. It has now been found that it can be prepared in high yield in a highly pure state in only several hours in a heterogeneous system. In addition, the product precipitates as it is formed and can be filtered off for ready final purification with common solvents.

According to this invention, hexakis(aziridinyl)phosphonitrile is prepared by reacting phosphonitrilic chloride with ethyleneimine in an aqueous medium containing an alkali metal hydroxide as hydrogen chloride acceptor and a minor amount of a water-immiscible aromatic hydrocarbon. In this system, the phosphonitrilic chloride is preferentially soluble in the aromatic hydrocarbon phase which contains the ethyleneimine thus promoting a quick reaction. The partially reacted materials are soluble in the aromatic hydrocarbon but not in the water. Although the product is soluble in water, it precipitates in the presence of the alkali metal hydroxide which also removes the hydrogen chloride formed during the reaction. The product may be promptly removed from the reaction mixture, e.g. by filtration, and readily purified from the coprecipitated alkali metal chloride by extraction with a common solvent such as carbon tetrachloride, benzene, toluene, heptane or other hydrocarbon solvents.

To obtain the benefits of this invention three critical ingredients must be present—water, aromatic hydrocarbon and alkali metal hydroxide. Another critical element is the amount of aromatic hydrocarbon. Although the aromatic hydrocarbon must be present, it is equally important to keep the proportion of this material to a relatively small but essential quantity. For each part of water there should be 0.1 to 3 parts of aromatic hydrocarbon on a volume basis, but it is preferable to have an excess of water, e.g. a ratio of about 5:1 (water:hydrocarbon, vol./vol.). The aromatic hydrocarbons which may be used include for example, aromatic petroleum hydrocarbons such as benzene, toluene, xylene and the like.

The preferred hydrogen chloride acceptor is sodium hydroxide but the other alkali metal hydroxides, especially potassium hydroxide, may also be used. The alkali metal hydroxide should preferably be present in an amount at least 75% in excess (on a molar basis) of the theoretical quantity necessary to neutralize the hydrogen chloride formed, but 10 to 18 moles of hydroxide for each mole of phosphonitrilic chloride may be used to advantage.

A slight excess of ethyleneimine with respect to phosphonitrilic chloride present is also preferably present. That is, up to about 15% in excess of the stoichiometric amount necessary to react with the phosphonitrilic chloride on a theoretical basis (6:1) may be used.

The phosphonitrilic chloride is advantageously added portionwise to a mixture of all other ingredients with agitation. Best results are obtained if the temperature of the reaction mixture is kept low during the addition of the phosphonitrilic chloride. The temperature may be held within the range of about 0° to 25° C., preferably at the lower end of the range. After the addition, the temperature may be raised by heating to about 65° to 75° C. to accelerate the reaction. About 2 to 6 hours, preferably 2.5 to 4 hours, is usually sufficient to complete the reaction.

The hexakis(aziridinyl)phosphonitrile begins to precipitate immediately from the reaction mixture and may be removed, e.g. by filtration. The coprecipitated alkali metal chloride may be readily removed from the product by extraction with a hot solvent of the character indicated previously to obtain highly pure product. The benzene, alkali metal hydroxide and other unused materials may be readily recovered for reuse.

The following example is illustrative of the invention.

*Example*

A solution of 198.4 grams (4.8 moles) of sodium hydroxide in 500 milliliters of water is placed in a flask fitted with a high speed stirrer and cooled to 15° C. Benzene (100 milliliters) and 113 grams (2.63 moles) of ethyleneimine are added. The flask is cooled in an ice bath while 139.4 grams (0.4 mole) of finely ground phosphonitrilic chloride trimer are added with stirring in small portions at such a rate as to keep the temperature below 20° C. The addition takes 30 minutes. The mixture is heated to 68° C., stirred at a temperature of 68 to 73° C. (reflux temperature) for four hours, cooled in an ice bath to 15° C., and filtered. The crude solid obtained from the filtration is dried and recrystallized from carbon tetrachloride. The resulting white, crystalline solid, after grinding to a fine powder and air-drying in an open tray, gives 130.7 grams (84.4 percent yield) of completely water-soluble hexakis(aziridinyl)phosphonitrile, M.P. 152–153° C.

What is claimed is:
1. A process for the production of hexakis(aziridinyl)-phosphonitrile which comprises reacting trimeric phosphonitrilic chloride with ethyleneimine in a water-aromatic hydrocarbon medium, wherein the ratio of water to hydrocarbon is about 1:0.1 to 3, in the presence of an excess of alkali metal hydroxide.

2. A process as in claim 1 wherein the aromatic hydrocarbon is benzene and the alkali metal hydroxide is sodium hydroxide.

3. A process for the production of hexakis(aziridinyl)-phosphonitrile which comprises reacting trimeric phosphonitrilic chloride with ethyleneimine in an aqueous benzene medium, wherein the ratio of water to benzene is about 5 to about 1, in the presence of about a 75% excess of sodium hydroxide and filtering the product from the reaction mixture.

4. A process for the production of hexakis(aziridinyl)-phosphonitrile which comprises reacting trimeric phosphonitrilic chloride with not more than about 15% in excess of the stoichiometric amount of ethyleneimine under agitation for about 2 to about 6 hours at a temperature below about 75° C. in an aqueous benzene medium, the ratio of water to benzene being about 5 to about 1, in the presence of about a 75% excess of sodium hydroxide and recovering the product from the reaction mixture.

5. A process for the production of hexakis(aziridinyl)-phosphonitrile which comprises adding trimeric phosphonitrilic chloride portionwise at a temperature of about 0° to 25° C. to an aqueous benzene medium having a water to benzene ratio of about 5 to about 1 and containing ethyleneimine in not more than about 15% in excess of the stoichiometric amount and at least about a 75% excess of sodium hydroxide, agitating the mixture for about 2 to 6 hours at a temperature of about 65° to 75° C. and recovering the hexakis(aziridinyl)phosphonitrile.

References Cited in the file of this patent

UNITED STATES PATENTS

| | | |
|---|---|---|
| 2,670,347 | Kuh et al. | Feb. 23, 1954 |
| 2,858,306 | Ratz et al. | Oct. 28, 1958 |

OTHER REFERENCES

Audrieth et al.: Chem. Reviews, volume 38, pages 102–105.

Audrieth, Record of Chem. Progress, volume 20, No. 2, June 1959, page 61.

Stokes: Ber. Deut. Chem., vol. 28, pages 437–439 (1895).